(12) United States Patent
Lazzarino et al.

(10) Patent No.: US 11,673,427 B2
(45) Date of Patent: Jun. 13, 2023

(54) CASTER ANTI-TILT DEVICE

(71) Applicant: CART SOURCE LLC, Palm Beach, FL (US)

(72) Inventors: Nadia Lazzarino, Vaughan (CA); Phillip Lazzarino, Vaughan (CA)

(73) Assignee: Cart Source LLC, Palm Beach, FL (US)

( * ) Notice: Subject to any disclaimer, the term of this patent is extended or adjusted under 35 U.S.C. 154(b) by 253 days.

(21) Appl. No.: 16/995,596

(22) Filed: Aug. 17, 2020

(65) Prior Publication Data

US 2022/0048320 A1 Feb. 17, 2022

(51) Int. Cl.
*B60B 33/00* (2006.01)
*B62B 5/04* (2006.01)

(52) U.S. Cl.
CPC ...... *B60B 33/0089* (2013.01); *B60B 33/0039* (2013.01); *B60B 33/0081* (2013.01); *B62B 5/049* (2013.01); *B62B 5/0423* (2013.01)

(58) Field of Classification Search
CPC .......... B60B 33/0089; B60B 2200/432; B62B 5/0423; B62B 5/049
USPC ................................... 280/33.994
See application file for complete search history.

(56) References Cited

U.S. PATENT DOCUMENTS

| | | | | | |
|---|---|---|---|---|---|
| 2,033,207 | A | * | 3/1936 | Schultz, Jr. | ......... B60B 33/0078 16/32 |
| 3,083,398 | A | * | 4/1963 | Swalm | ................. B62B 5/0423 16/31 R |
| 3,217,839 | A | * | 11/1965 | Watkins | ................. B62B 5/049 188/4 R |
| 3,272,527 | A | * | 9/1966 | Martin | ................. B62B 5/0423 280/33.994 |
| 3,656,203 | A | * | 4/1972 | Waflart, Jr. | ......... B60B 33/0089 16/35 R |
| 3,691,590 | A | * | 9/1972 | Drabert | ................... B60B 33/00 297/310 |
| 3,719,370 | A | * | 3/1973 | Gintick | ................. B62B 5/0423 280/33.994 |
| 3,804,211 | A | * | 4/1974 | Scherzinger | ........ B60B 33/0089 188/2 R |
| 3,949,444 | A | * | 4/1976 | Martinson | ........... B60B 33/0089 16/35 R |
| 4,138,763 | A | * | 2/1979 | Cooley | ............... B60B 33/0089 248/188.8 |

(Continued)

*Primary Examiner* — Jeffrey O'Brien

(57) ABSTRACT

An anti-tilt device for a caster that includes a wheel, rotatably mounted in a frame, for rotation about a rotation axis. The anti-tilt device, comprising first and second face plates; first and second flanges extending from opposing edges of said first plate, each of the first and second flanges wrapping beside the first face plate; first and second flanges extending from opposing edges of said second face plate, each of the first and second flange extending beside the first face plate, to prevent rotation of the first and second face plates when mounted to the caster frame; first and second legs extending from the first second face plates, respectively; and a bar, extending between the first and second legs across a tread face of said caster wheel when mounted to said frame, at a defined angle of the tread face, as measured from a vertical axis extending through said rotation axis, when said caster is level. Each of said first and second legs includes a defined bend to place said bar at said defined angle.

13 Claims, 5 Drawing Sheets

(56) References Cited

U.S. PATENT DOCUMENTS

| | | | | |
|---|---|---|---|---|
| 4,339,842 | A * | 7/1982 | Fontana | B60B 33/0089 16/32 |
| 4,503,943 | A * | 3/1985 | Tsukui | B60B 33/0089 16/34 |
| 6,054,923 | A * | 4/2000 | Prather | B62B 5/0423 340/568.5 |
| 6,183,405 | B1 * | 2/2001 | Schurig | B60B 33/0039 492/45 |
| 6,264,217 | B1 * | 7/2001 | Le Roux | B62B 5/0423 280/43.24 |
| 6,374,955 | B1 * | 4/2002 | Gray | B62B 5/0423 188/111 |
| 6,502,669 | B1 * | 1/2003 | Harris | B60B 33/0057 280/33.994 |
| 7,225,903 | B2 * | 6/2007 | Nebolon | B62B 5/0423 188/19 |
| 8,214,970 | B2 * | 7/2012 | Sullivan | B60B 33/0068 16/18 B |
| 8,267,226 | B2 * | 9/2012 | Gray | B62B 5/0423 188/4 B |
| 9,937,750 | B1 * | 4/2018 | Nelson | B60B 33/06 |
| 10,023,007 | B2 * | 7/2018 | Horch | B60B 33/0094 |
| 11,046,345 | B2 * | 6/2021 | Kawade | B60T 1/04 |
| 2010/0005620 | A1 * | 1/2010 | Gray | B60B 33/0073 16/47 |
| 2020/0346490 | A1 * | 11/2020 | Li | B60B 33/06 |

* cited by examiner

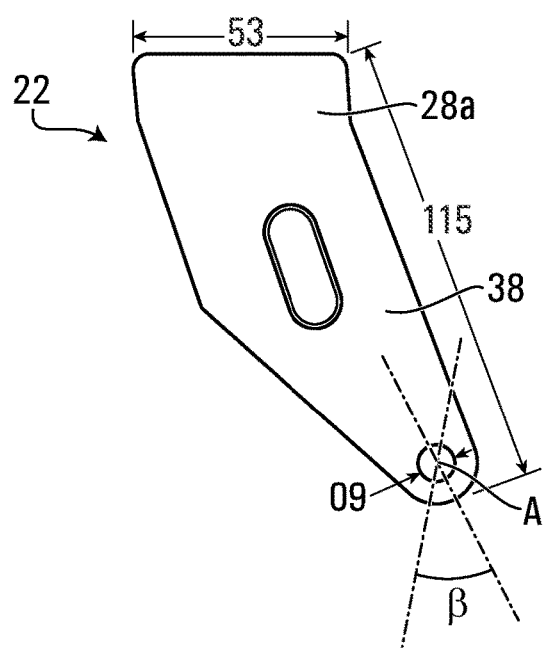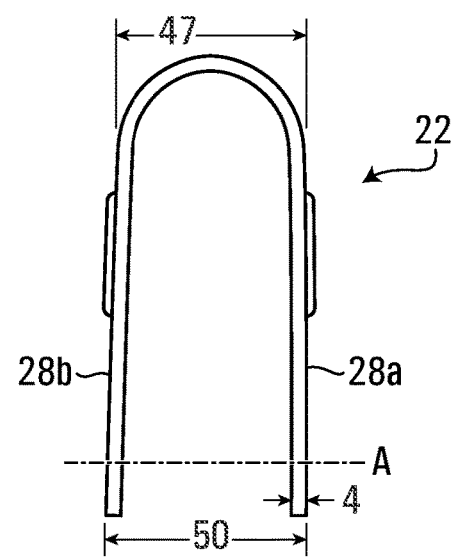
FIG. 2
FIG. 3

CASTER ANTI-TILT DEVICE

FIELD

This relates to casters, and more particularly to anti-tilt devices for use with casters of shopping carts.

BACKGROUND

Modern shopping carts are oft equipped with anti-theft systems. One common anti-theft system includes one or more locking wheels installed in place of existing caster wheels. The newly installed locking wheels selectively lock in response to crossing a defined boundary. The locking wheels may include a radio receiver that locks in response to crossing an established radio boundary, created by a complementary transmitter. Once a locking wheel is locked, movement of the cart is made difficult, if not impossible.

In order to reduce costs, an anti-theft system typically relies on replacing a single caster of an existing shopping cart with a caster having a locking wheel. Typically, one of the front wheels is locked.

A simple work-around to the above described anti-theft system is to tilt the shopping cart. Thus, for example, if a front wheel is locked, the cart may be tilted rearward.

To prevent such work around, tilt prevention devices that prevent movement of the cart, when tilted, are known. Anti-tilt devices typically cause a tilted caster wheel to lift. One such tilt prevention device is disclosed in U.S. Pat. No. 7,225,903.

Existing tilt prevention devices, however, are often subject to forces equal to the weight of a shopping cart user, and are thus sometimes dislodged. Additionally, some devices are relatively complex to manufacture—formed of multiple parts.

Accordingly, there is a need for an improved anti-tilt device.

SUMMARY

According to an aspect, there is provided an anti-tilt device for a caster comprising a wheel, rotatably mounted in a frame, for rotation about a rotation axis, the anti-tilt device, comprising: first and second face plates; first and second flanges extending from opposing edges of the first plate, each of the first and second flanges wrapping beside the first face plate; first and second flanges extending from opposing edges of the second face plate, each of the first and second flange extending beside the first face plate, to prevent rotation of the first and second face plates when mounted to the caster frame; first and second legs extending from the first second face plates, respectively; a bar, extending between the first and second legs across a tread face of the caster wheel when mounted to the frame, at a defined angle of the tread face, as measured from a vertical axis extending through the rotation axis, when the caster is level; wherein each of the first and second legs includes a defined bend to place the bar at the defined angle.

According to another aspect, there is provided an anti-tilt device for a caster comprising a wheel, rotatably mounted in a frame for rotation about a rotation axis, the anti-tilt device comprising: a bent, generally flat piece of metal, comprising: a central portion, first left and right rectangular portions extending from either end of central portion, second left and right rectangular portions each extending at an angle from respective first right and left rectangular portions; two trapezoidal portions, that each define a face plates, and that each extend respectively from the second left and right rectangular portions; wherein the central portion is bent to form a bar, that extends between left and right rectangular portions across a tread face of a caster wheel when the anti-tilt device is mounted to the caster frame.

According to another aspect, there is provided an anti-tilt device for a caster comprising a wheel, rotatably mounted in a frame for rotation about a rotation axis, the anti-tilt device comprising: a bent, generally flat piece of metal, comprising: a central portion, a left and right leg portions extending from either end of central portion; two trapezoidal portions, that each define a face plates, and that each extend respectively from the left and right leg portions; mounting holes for mounting the anti-tilt device so that the mounting holes are coaxial with the rotation axis; wherein the central portion is bent to form a bar, that extends between left and right leg portions across a tread face of the wheel when the anti-tilt device is mounted to the frame, and wherein the left and right leg portions are shaped to position the bottom of the central portion at a defined angle of the tread face, as measured from a vertical axis extending through the rotation axis, when the caster is level.

Other features will become apparent from the drawings in conjunction with the following description.

BRIEF DESCRIPTION OF THE DRAWINGS

In the figures which illustrate example embodiments,

FIG. 2 is a side view of a frame of the caster of FIG. 1;

FIG. 3 is an end view of the frame of FIG. 2;

DETAILED DESCRIPTION

Figure 1:
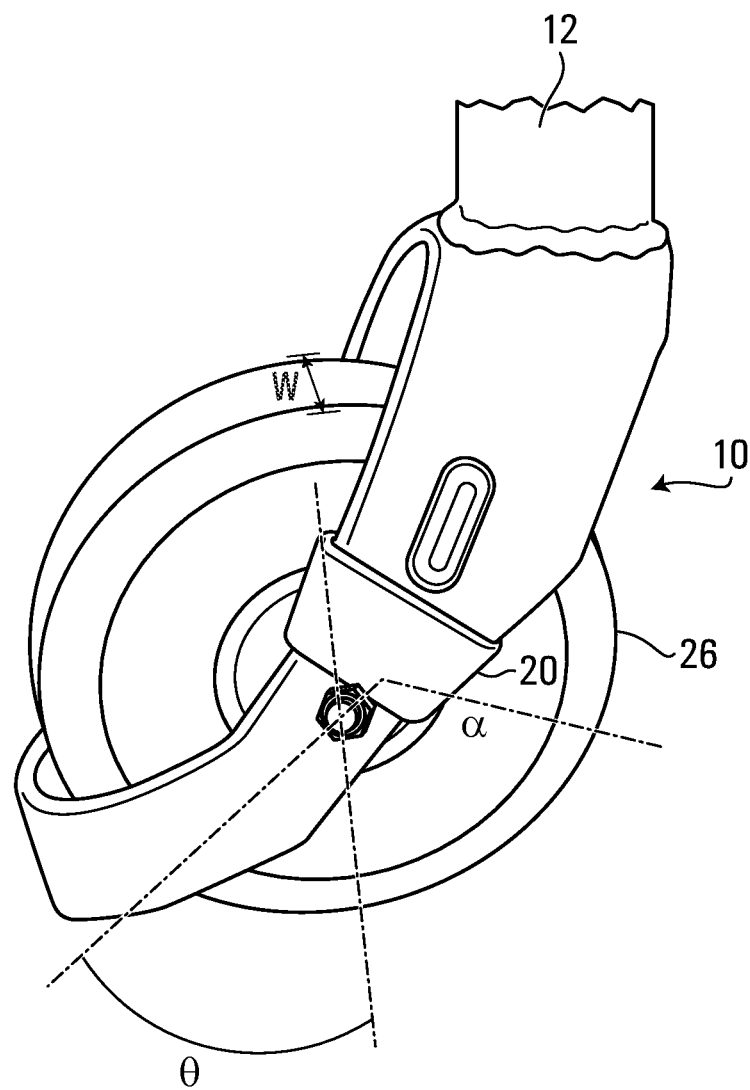
FIG. 1 is a perspective view of a caster including an anti-tilt device, exemplary of an embodiment.
Figure 1A:
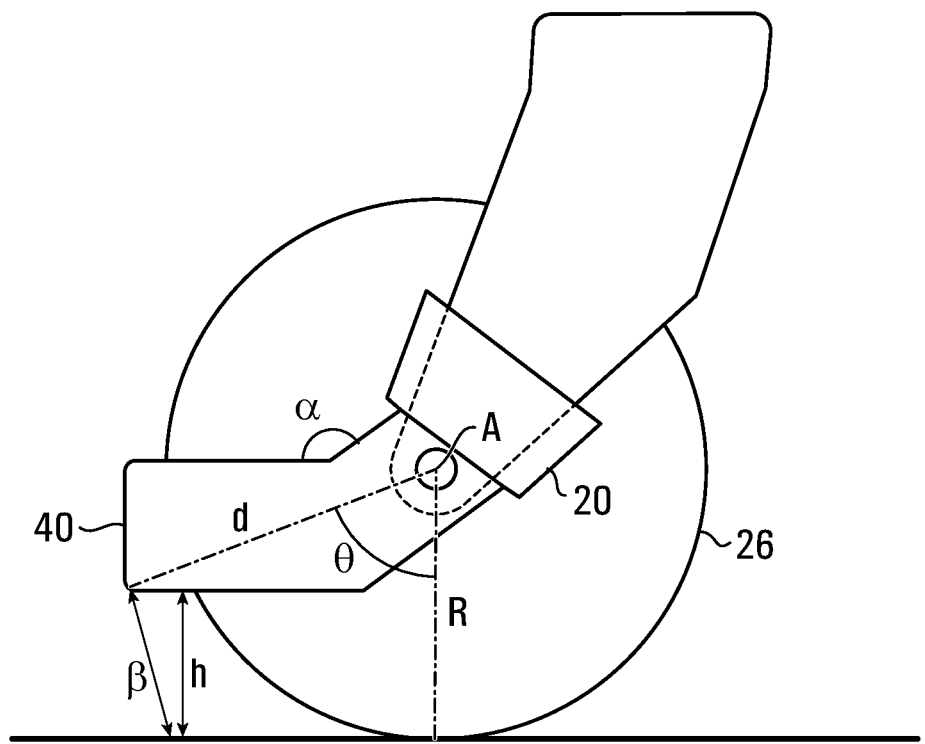
FIG. 1A is a side view of the caster of FIG. 1.

FIGS. 1 and 1A illustrate a caster 10 of a cart 12, including an exemplary anti-tilt device 20, exemplary of an embodiment, mounted thereto.

Caster 22 is conventional and includes a frame 24 illustrated in FIGS. 2 and 3. Caster 22 includes a wheel 26 illustrated in FIG. 1. Wheel 26 has a radius R, and a tread having width W. Wheel 26 is rotatably mounted in frame 24, for rotation about a rotation axis A. Frame 24 includes generally flat side walls 28a and 28b. Each of side walls 28a and 28b include a generally triangular portion 38 to which wheel 26 is mounted. Triangular portion 38 of each of side walls 28a and 28b thus has a tapering width.

Caster 22 may be a fixed caster, fixedly mounted to the rear of a shopping cart. The shopping cart (not illustrated) typically includes three other casters (also not shown). Typically one of these other casters—mounted at the front of the shopping cart—includes a locking wheel that is part of an anti-theft system. The locking wheel may lock if the cart is removed from a particular location, in an effort to immobilize the cart. Anti-tilt device 20 serves to prevent the cart from being tipped backwards and rolled on wheel 26.

Figure 4:
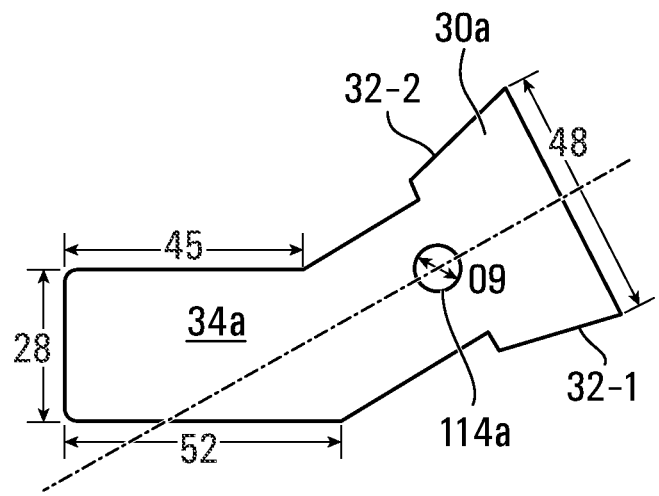
FIG. 4 is a side view of the anti-tilt device of FIG. 1 in isolation.
Figure 5:
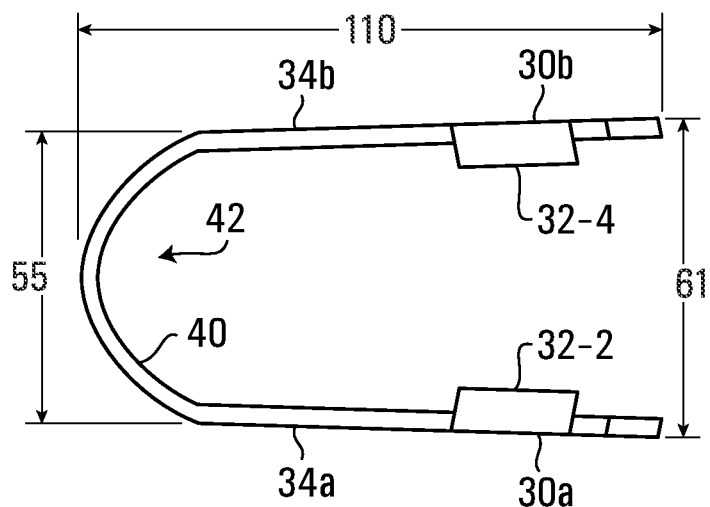
FIG. 5 is an end view of the anti-tilt device of FIG. 4.

Anti-tilt device 20 is further illustrated in isolation in FIGS. 4 and 5. As illustrated, anti-tilt device 20 includes first and second opposite face plates 30a and 30b. First and second flanges 32-1 and 32-2 extend from opposing edges of the first plate 30a, each of the first and second flange 32-1 and 32-2 wrapping beside first face plate 30a, as best illustrated in FIG. 5. Flanges 32-1, 32-2, 32-3, and 32-4 are referred to as flanges 32, individually and collectively.

Likewise, first and second flanges 32-3 and 32-4 extend from opposing edges of second face plate 30b. Each of the flanges 32-3 and 32-4 likewise extends beside the second face plate 30b. First and second flanges 32-1, 32-3 and 32-2, 32-4 may loop behind face plates 30a and 30b. The space between flanges 32-1 and 32-2 and face plate 30a define a pocket that may receive a side wall 28 of caster 22—as illustrated in FIG. 1. Similarly, the space between flanges 32-3 and 32-4 and face plate 30b define a pocket that may receive a side wall 28 of caster 22 near its opposing edge—as illustrated in FIG. 1. The pocket may be about the thickness of side wall 28. In an embodiment, the pocket may have a thickness of about 3 mm. As will become apparent, flanges 32 prevent rotation of face plates 30a and 30b (and hence anti-tilt device 20) relative to caster frame 24 (e.g. about axis A).

A leg 34a extends from face plate 30a. A like shaped leg 34b extends from face plate 30b. Legs 34a and 34b are thus opposed to each other. Legs 34a and 34b are referred to as legs 34, individually and collectively. Leg 34a and face plate 30a are co-planar. Likewise leg 34b and face plate 30b lie in the same plane. The planes of leg 34a and leg 34b are generally parallel, as for example evident in FIG. 5.

A bar 40, extends between legs 34a and 34b, between the planes of face plates 30a and 30b, to extend across a tread face of wheel 26 of caster 22, when anti-tilt device 20 is mounted to caster frame 24, as best viewed in FIG. 1. Bar 40 may be formed into an arc 42, as depicted in FIG. 5. The length of bar 40 is about equal to the width W of the tread of wheel 26.

The geometry of legs 34a and 34b places bar 40 at a defined angle θ of the tread face, as measured from a vertical axis (when the shopping cart to which caster 22 is placed on a level surface, without tilt), and a defined height h from the ground, as illustrated in FIG. 1A. This, in turn, places bar 40 a defined distance d, from axis A, where d is greater than the radius R of wheel 26. As will be appreciated, the defined angle θ and defined height h will control the amount of tilt of caster 22 (and hence a cart attached to it) is possible, without bar 40 touching the ground and preventing wheel 24 from rolling on the ground. Angle θ may be measured as the angle between a line passing through axis A to the trailing (e.g. rear) edge of bar 40, and a co-planar line extending vertically through axis A, when caster 22 is on a horizontal surface.

Thus, when the caster 22 and attached cart is tilted backward to move bar 40 by height h, bar 40 contacts the ground, and prevents wheel 26 from rolling—either because it is lifted or obstructed by bar 40. Angle θ is typically chosen to be between 0 an 60, and preferably between 30 and 45° (e.g. about 40°). For a 6.3 cm wheel (i.e. R=6.3 cm) Height h is between about 8 and 10 mm to 15 mm, but could be higher. This translates into a tilt angle β of about 14°. Distance d, in turn is about 8.0-8.2 cm from axis A.

As illustrated, face plates 30a and 30b are generally trapezoidal with tapered edges that generally conform to the edges of caster frame 24. A mounting hole 114a is located on face plate 30a and leg 34a. Likewise a mounting hole 114b is formed on face plate 30b. Mounting holes 114a, 114b allow face plates 30a and 30b to be mounted atop of frame 24, to the same bolt used to affix wheel 26 to frame 24. As illustrated in FIG. 1, the same nut is used to mount face plates 30a/30b and wheel 26 to frame 24.

As illustrated in FIG. 1, once installed on caster frame 24, flanges 32 prevent the rotation of anti-tilt device 20 and bar 40, about axis A. Moreover, the trapezoidal shape of face plates 30a and 30b cause the flanges 32 to tightly engage the edges of walls 28a and 28b as walls 28a and 28b are slid deeper into the pockets created by flanges 32. Conveniently, both walls 28a and 28b are engaged to prevent rotation of anti-tilt device 20.

Legs 34 include a bend, that may be formed by forming each leg 34 as two rectangular portions offset by an angle α to place bar 40 at the desired angle θ and height h, while allowing flanges 32 of face plates 30a and 30b to still engage with wall 28a/28b to prevent rotation of face plates 30a and 30b (and hence anti-tilt device 20) about axis A. In alternate embodiments, leg 34 could be curved to place bar at the desired offset. In the depicted embodiment, α is obtuse— between 130° and 160°.

Figure 6:
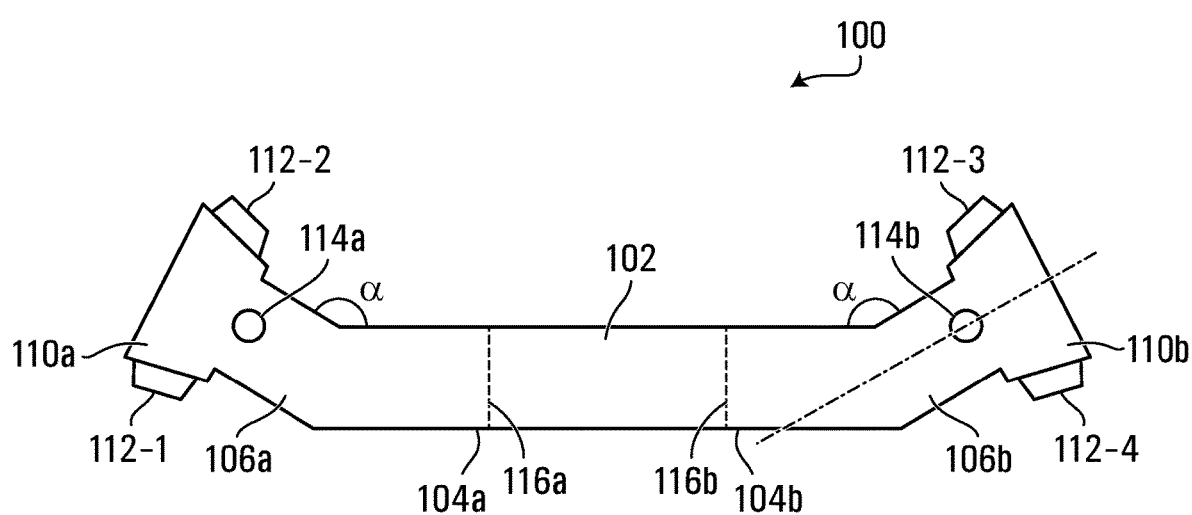
FIG. 6 is a plan view of a stamped metal piece, used to form the anti-tilt device of FIG. 4.

FIG. 6 illustrates a strip 100 that may be formed into anti-tilt device 20. Strip 100 may be formed of stamped metal, or otherwise.

As illustrated, strip 100 includes a central portion 102 that is slightly larger than tread width W. Extending from central portion 102 are first left and right rectangular portions 104a, and 104b. Extending, respectively, from first rectangular portions 104a and 104b are second rectangular portions 106a, and 106b. Portions 104a and 106a define leg 34a. Similarly portions 104b and 106b define leg 34b. Collectively, portions 104a/106a and 106a/106b can be considered leg portions of strip 100.

Formed at the ends of rectangular portions 106a and 106b are trapezoidal portions 110a and 110b, that define face plates 30a and 30b. Rectangular tab portions 112-1 and 112-2 extend outward from trapezoidal portion 110a, rectangular tab portions 112-3 and 112-4 extend outward from trapezoidal portion 110b. Rectangular tab portions 112-1, 112-2, 112-3 and 112-4 are referred to individually and collectively as rectangular tab portions 112.

Strip 100 further includes circular mounting holes 114a and 114b, formed at least partially in trapezoidal portions 110a, 110b, respectively.

Strip 100 may be formed into anti-tilt device 20 by bending portion 102 into arc 42 (FIG. 5), at bend lines 116a and 116b. An anvil or shoe or other form may be used to produce an arc 42 having a desired contour, as for example illustrated in FIG. 5. Tabs 112 may be bent inward from respective trapezoidal portions 110a and 110b to form flanges 32.

The dimensions of strip 100 will depend on the size and geometry of caster 22. As illustrated, the width of trapezoid portions 110a and 110b should conform to the edge-edge width of triangular portion 38 to allow wall 28 to tightly be tightly held by flanges 32. Portion 102 should be at least as wide as the wheel track width W, and portions 104a/104b and 106a/106b must be long enough to place wall 40 (formed by portion 102 beyond the radius of when 26, to allow wheel 26 to freely rotate on axis A. In embodiments, portions 104a/104b and 106a/106b, are each between 2 and 6 cm long, while the width of portions 104a/104b and 106a/106b is between 1 and 3 cm. The thickness of strip is generally uniform, and may be between about 1 mm and 5 mm, preferably 3 mm. As noted angle α is obtuse—typically between 100° and 160°. In the depicted embodiment, angle α is about 160°. The length of portions 104a/104b and 106a/106b are further sufficient to place bar 40 at angle θ.

Of course, the above described embodiments are intended to be illustrative only and in no way limiting. The described embodiments are susceptible to many modifications of form, arrangement of parts, details and order of operation. The invention is intended to encompass all such modification within its scope, as defined by the claims.

What is claimed is:

1. An anti-tilt device for a caster comprising a wheel, rotatably mounted in a frame, for rotation about a rotation axis, said anti-tilt device, comprising:
   first and second face plates;
   first and second flanges extending from opposing edges of said first face plate, each of the first and second flanges of the first face plate wrapping beside the first face plate for engagement with the frame;
   first and second flanges extending from opposing edges of said second face plate, each of the first and second flanges of the second face plate wrapping beside the second face plate for engagement with the frame;
   wherein the first and second flanges of the first face plate and the first and second flanges of the second face plate prevent rotation of the first and second face plates with respect to the caster frame;
   first and second legs extending from the first and second face plates, respectively;
   a bar, extending between the first and second legs across a tread face of said caster wheel when mounted to said frame, at a defined angle of the tread face, as measured from a vertical axis extending through said rotation axis, when said caster is level;
   wherein each of said first and second legs includes a defined bend to place said bar at said defined angle.

2. The anti-tilt device of claim 1, wherein said bar comprises a bottom edge, and wherein an axis extending from said rotation axis to said bottom edge is offset by a defined tilt angle from an axis extending vertically through said rotation axis.

3. The anti-tilt device of claim 2, wherein said defined angle is between 20° and 50°.

4. The anti-tilt device of claim 1, wherein said first and second face plates have mounting holes pierced by said rotation axis.

5. The anti-tilt device of claim 1, wherein said first and second face plates and said bar are formed of metal.

6. The anti-tilt device of claim 5 wherein said bar is bent from said metal to form an arc.

7. The anti-tilt device of claim 4, wherein said first and second face plates are opposite each other in aligned planes, with the mounting hole of the first face plate aligned with the mounting hole of the second face plate.

8. The anti-tilt device of claim 1, wherein the first leg comprises a first right rectangular portion extending from the bar and a second right rectangular portion extending at an angle from the first right rectangular portion; the second leg comprises a first left rectangular portion extending from the bar and a second left rectangular portion extending at an angle from the first left rectangular portion; a first trapezoidal portion defining the first face plate extending from the second right rectangular portion; a second trapezoidal portion defining the second face plate extending from the second left rectangular portion.

9. The anti-tilt device of claim 8, wherein a mounting hole is formed at least partially in each of the first and second trapezoidal portions.

10. The anti-tilt device of claim 9, wherein the angle between the first left rectangular portion and the second left rectangular portion is between 100° and 160°, and wherein the angle between the first right rectangular portion and the second right rectangular portion is between 100° and 160°.

11. The anti-tilt device of claim 8, wherein said bar comprises a bottom edge, and wherein when said anti-tilt device is mounted on said caster, said bottom edge is mounted at a defined height above the ground.

12. The anti-tilt device of claim 1, further comprising a first trapezoidal portion defining the first face plate extending from the first leg; a second trapezoidal portion defining the second face plate extending from the second leg; and mounting holes for mounting the anti-tilt device so that the mounting holes are coaxial with the rotation axis.

13. The anti-tilt device of claim 12, wherein said defined angle is between 20° and 60°.

* * * * *